Nov. 30, 1948.  D. H. CLEWELL  2,454,911

GEOLOGICAL EXPLORATION SYSTEM

Filed Aug. 12, 1944  2 Sheets-Sheet 1

INVENTOR.
DAYTON H. CLEWELL
BY
Sidney A. Johnson
ATTORNEY

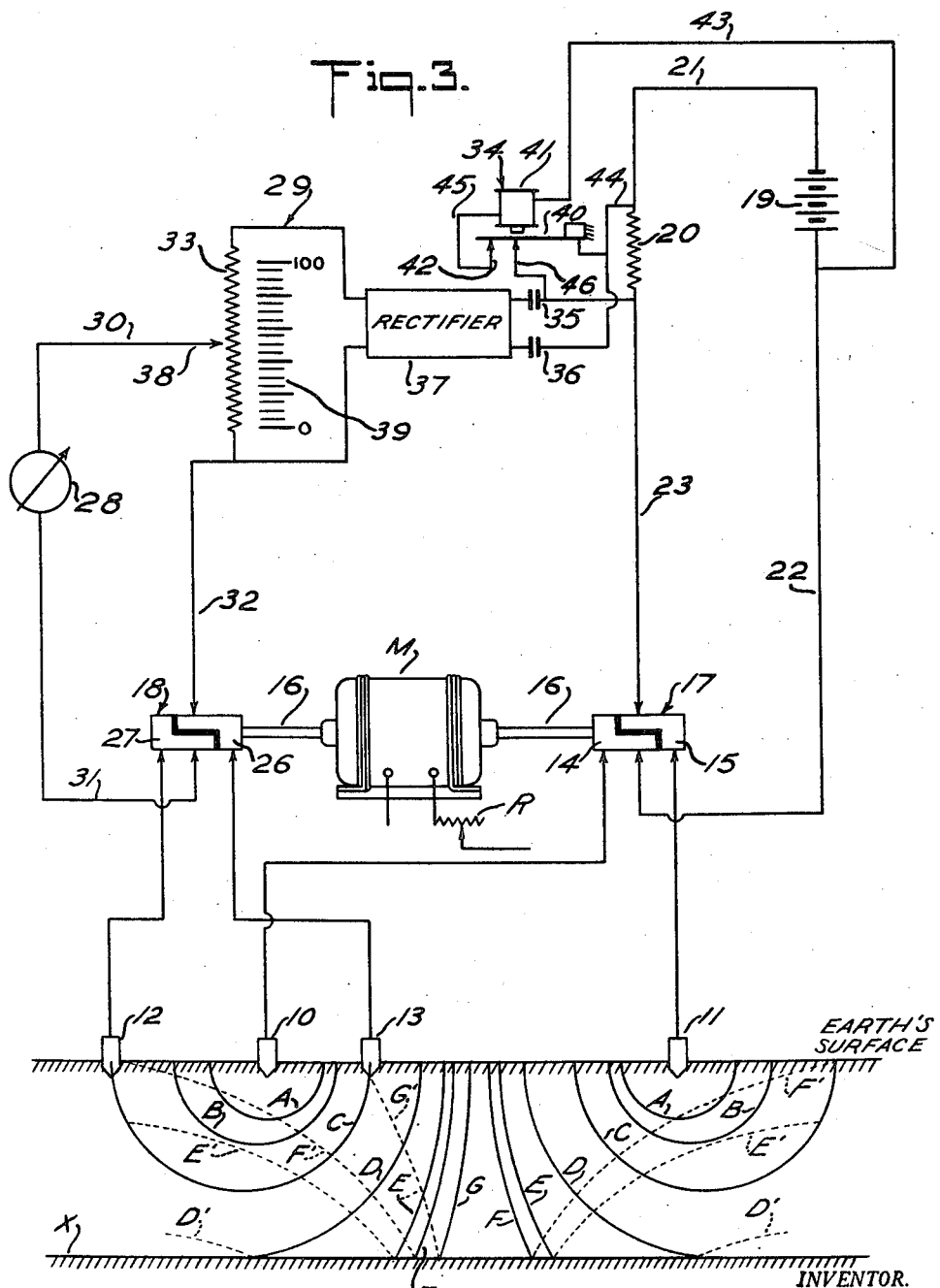

Patented Nov. 30, 1948

2,454,911

UNITED STATES PATENT OFFICE 2,454,911

GEOLOGICAL EXPLORATION SYSTEM

Dayton H. Clewell, Dallas, Tex., assignor, by mesne assignments, to Socony-Vacuum Oil Company, Incorporated, New York, N. Y., a corporation of New York Application August 12, 1944, Serial No. 549,209

7 Claims. (Cl. 175—182)

1

This invention relates to a method of making geological explorations and more particularly, to an electrical prospecting method which tends to eliminate the effects of strong waves caused by near-surface strata.

There have been many schemes proposed for prospecting by electrical methods, and especially have there been many in which low frequency alternating current has been applied to the earth's surface through suitable electrodes. Alternating current is generally preferred in order to prevent polarization of the electrodes and to provide electrical circuits by means of which the natural earth currents, which are direct currents, may be eliminated. With systems of this character, knowledge of the sub-surface strata is obtained usually by measuring the potential field set up by the alternating current. The alternating current is introduced into the earth through two "current" electrodes and the potential difference between any two points on the surface of the earth under the influence of the alternating current is measured by two "potential" electrodes. The character of the potentials so measured is influenced by the nature of the subterranean strata. The depth to which the alternating current penetrates, and hence, the depth of the strata which influence the measured potentials, can be controlled by varying the spacing of the several electrodes and by varying the frequency of the alternating current. Despite the fact that some control of the depth of penetration can be exercised, experience has taught that the main features of the potential field are controlled by the near-surface layers of the earth and that the deeper strata give rise to only small second-order effects on the potential field which are difficult to discern.

It is the primary object of the present invention to provide a method of spacing the potential electrodes relative to the current electrodes in such a manner that the measured potential difference is relatively insensitive to near-surface effects.

For a more detailed explanation of the invention, and for further objects and advantages thereof, reference is to be had to the following detailed description taken in conjunction with the accompanying drawings in which.

Fig. 3 diagrammatically illustrates apparatus

2 used to generate and measure the electrical potentials in the earth.

Figure 1:
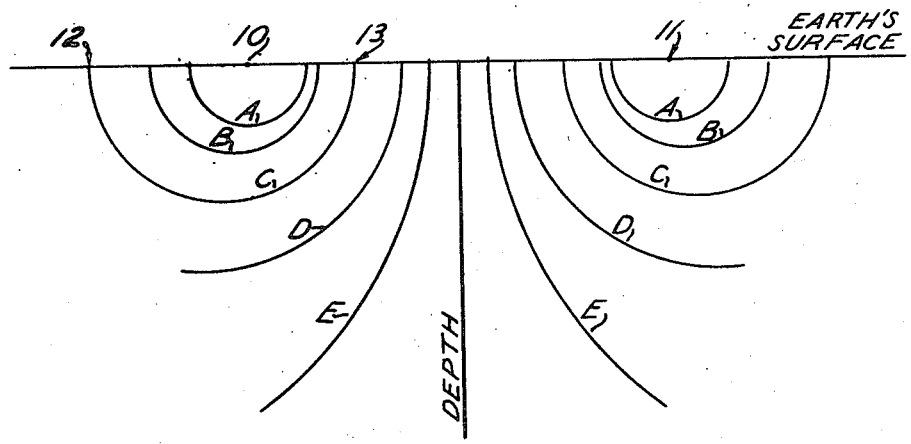
Fig. 1 illustrates the equipotential surfaces set up in a homogeneous earth by a pair of current electrodes as a function of depth.
Figure 2:
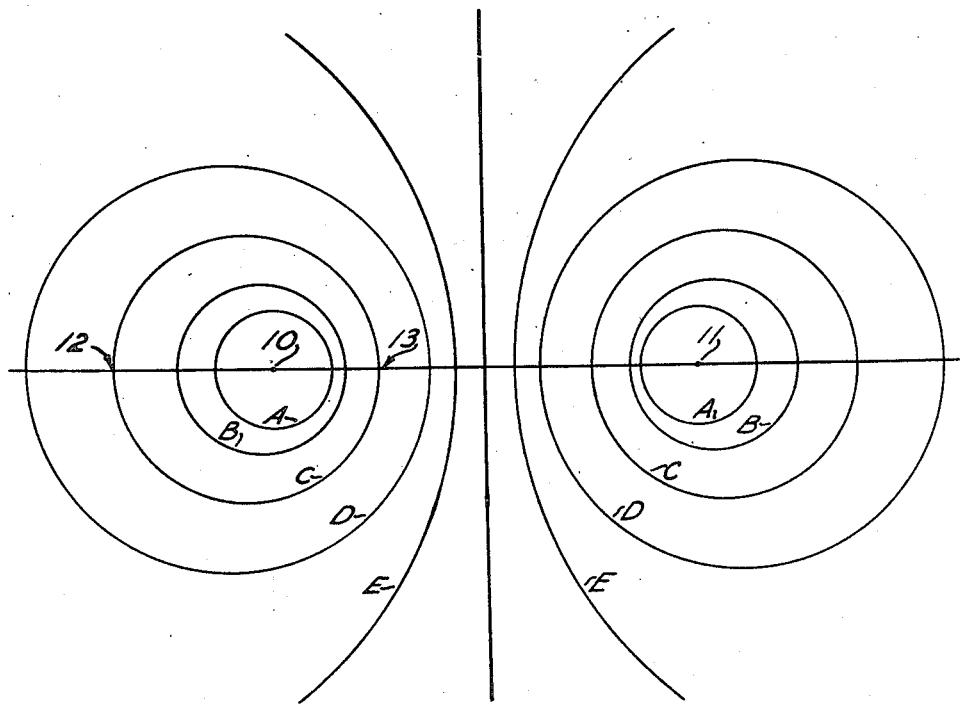
Fig. 2 illustrates the areal extent of the same potential field.

In accordance with the present invention, alternating current of controllable frequency is introduced into the earth through two current electrodes. Due to the flow of current in the earth, a system of equipotential surfaces will be set up. If the earth is perfectly homogeneous, and if the alternating current is of very low frequency, the positions of these equipotential surfaces can be calculated by well known formulae and can be represented graphically as shown in Figs. 1 and 2. In Fig. 1, the intersections of the equipotential surfaces with a vertical plane through the current electrodes 10 and 11 are shown, while in Fig. 2 are shown the horizontal intersections of these same equipotential surfaces with the surface of the earth. If now the potential electrodes are placed at the positions 12 and 13, they will both be on the potential surface C and there will be a zero potential difference between the two potential electrodes. In any actual case of geological prospecting, the earth is stratified and the equipotential surfaces are distorted from the regular pattern shown in Figs. 1 and 2. It is also well known that as the frequency of the alternating current is increased, the penetration of the current is lessened and the equipotential surfaces are still further distorted.

In accordance with the invention, it has been found advantageous to place the potential electrodes relative to the current electrodes in such a manner that for alternating current having a frequency of 20 cycles per second or more they are on substantially the same equipotential surface. As the frequency of the alternating current is decreased, the amount of penetration increases and the distortions of the resultant potential field, due to equipotential surfaces reflected from the deeper subsurface geologic strata, give rise to differences in potential between the potential electrodes which, though small, can be measured readily since they are not superimposed on large potential differences which would be present with conventional electrode arrangements. These subsurface strata which change the potentials may be fairly deep in the earth, for example, below fifteen hundred feet.

One embodiment of this invention is shown in detail in Fig. 3. A variable speed motor M has a shaft 16, to the two ends of which are affixed commutators 17 and 18. A source of direct current, such as a battery 19, is connected in series with a resistance 20 and the commutator 17 by means of the conductors 21, 22 and 23. The current electrode 10 is connected to one segment 14 of the commutator 17, and the other current electrode 11 is connected to the segment 15 of the commutator 17. Thus, an alternating current of frequency equal to the number of revolutions per second of the motor shaft 16 is delivered to the current electrodes. The direct current flowing in the resistor 20 will produce a voltage thereacross proportional to the alternating current fed into the earth or ground. The voltage picked up by the potential electrodes 12 and 13 is measured as follows: The electrode 12 is connected to the segment 27 of the commutator 18, and the electrode 13 is connected to the segment 26 of the same commutator. A galvanometer 28 is connected in series with the commutator 18 and a portion of the resistance 33 of a slidewire 29 by means of conductors 30, 31 and 32. The alternating potential picked up by the potential electrodes is thus rectified by the commutator 18 and fed to the galvanometer 28 as direct current.

Since it is desirable to measure the potential in terms of the magnitude of the alternating current fed into the earth, a comparison voltage proportional to the voltage across the resistor 20 is applied across the ends of the resistance 33 of the slidewire 29 by means of an interrupter 34, condensers 35 and 36, and rectifier 37. The movable arm 38 of the slidewire 29 is adjusted until the galvanometer 28 reads zero and the position of the movable arm is noted on the scale 39. This scale reading is proportional to, and is preferably calibrated so as to give the magnitudes of, the potential differences across the potential electrodes 12 and 13 in terms of the current in electrodes 10 and 11. By taking the readings in this manner, they are independent of fluctuations in the magnitude of the current in the current electrodes.

In order that no direct current flows between the input and measuring circuits, the interrupter 34, condensers 35 and 36, and the rectifier 37, mentioned above, have been provided. The interrupter consists of a vibrating reed 40, whose natural frequency is high compared to the frequency of the alternating current in the current electrodes, and which is maintained in a vibratory condition by the electromagnet 41, and contact 42. The coil of the electromagnet is connected to the battery 19 when the reed 40 is in its rest position by means of conductors 43, 45, 44 and 21, the reed 40, and contact 42. The magnet 41, when energized through the foregoing circuit, pulls the reed away from the contact 42, thus breaking the coil circuit and allowing the reed 40 to return to its rest position to repeat the cycle. In this manner, the reed is kept in sustained vibration. A second reed contact 46 is also provided which is connected to resistance 20 in such a manner that the resistance 20 is periodically shorted or removed from the circuit by the vibrating reed 40. As shown, it is shorted or bypassed with the reed 40 in its rest position. If the resistor 20 were to remain in the earth-current circuit including battery 19 and conductors 21, 23 and 22, a potential difference would appear across it which would remain constant with constant flow of earth current. However, the periodic insertion and removal changes that potential difference to one that is pulsating; that is, it gives rise to a periodically changing voltage that is applied through condensers 35 and 36 to the rectifier 37. The condensers 35 and 36 prevent any flow of direct current into the rectifier but, of course, do transmit a pulsating current to the rectifier. The direct current output of the rectifier 37 is applied directly across the resistor 33 of the slidewire 29.

In operating the apparatus in the field, the procedure is to locate electrodes 10 and 11 at desired locations, say several thousand feet apart. The motor 15 is then run at a predetermined, fairly high, speed, of the order of 20 revolutions per second. The potential electrodes 12 and 13 are located in line with the current electrodes 10 and 11 but the distance between the potential electrodes is varied until they are on substantially the same equipotential surface as evidenced by the fact that the galvanometer 28 reads zero with the movable arm 38 of the slidewire also at zero. Sometimes an exact zero balance cannot be obtained because of elliptical polarization of the alternating current in the earth, but in all cases the galvanometer can be made to read substantially zero with the slidewire also at zero. This is shown diagramatically in Fig. 3 in that electrodes 12 and 13 are on the equipotential surface C. Under these conditions, there is little penetration of the current into the earth and the equipotential surfaces D, E, F and G do not then reach down to the geologic boundary X. The motor speed is then reduced so that greater penetration results. When the equipotential surfaces D, E, F and G extend to the boundary X, there are established potential surfaces D', E', F' and G', as shown by the broken lines, according to the contrast in electrical properties on the two sides of the boundary or interface X. It will be noted in Fig. 3 that the potential electrodes 12 and 13 are not on the same reflected equipotential surface, one being on F' and the other on G'. Thus, the presence of the boundary X will be detected by the appearance of a potential difference across electrodes 12 and 13 when the frequency of the alternating current is low enough to permit penetration to the boundary X. While the potential surfaces alter their shape to some extent as the frequency is changed even if the boundary X is absent, nevertheless, the reduction of the strong potential differences set up by the near-surface layers relative to the potential differences resulting from deeper strata, results in easier, better, more accurate measurement of the potential differences which arise due to the reflections or the new potential surfaces from the subsurface boundary X.

Now that the principles of the invention have been explained, it will be understood that modifications may be made without departing from the spirit and scope thereof. For example, the speed of motor 15 may be adjusted, as by the speed-controlling resistor R, for production of alternating current at a frequency which produces penetration to the desired reflecting boundaries. For example, the frequency may be of the order of one-tenth of a cycle per second, or in some cases the frequency may be zero; that is, direct current may be applied to electrodes 10 and 11. The electrodes 12 and 13 will then be located at points which produce zero deflection of the galvanometer 28 with the slidewire 29 at its zero position. The speed of motor 15 is now increased to a predetermined higher value, preferably one where the reflections no longer appear. Hence, the electric field will change. The distortions of the potential surfaces so produced will then disappear. Therefore, a resulting potential difference appears between the electrodes 12 and 13 which is measured by adjustment of slidewire 29, as already described, to produce a potential difference of equal and opposite polarity to that existing across the electrodes 12 and 13.

In both methods of operation, the near surface effects of the applied current are, to substantial degree, eliminated and the resultant data secured from the scale 39 of the slidewire 29 are derived from the changes in potential on the electrodes 12 and 13, which changes are due to the reflections or electrical properties or character of the subsurface strata X.

What is claimed is:

1. A method of electrical prospecting which comprises applying alternating current between spaced points on the earth's surface to produce a system of equipotential surfaces, locating detecting stations at points on a selected one of said equipotential surfaces, varying the frequency of said alternating current to change the potential difference between said detecting stations by an amount due to reflections from a subsurface boundary, and measuring said resultant potential difference.

2. A method of electrical prospecting which comprises applying alternating current to spaced points of the earth's surface to produce a system of equipotential surfaces which extend into the earth, eliminating near-surface effects of said current by locating detecting stations on one of said equipotential surfaces, changing the frequency of said alternating current to increase the penetration of said equipotential surfaces into the earth until reflecting boundaries are reached, and measuring the potential difference between said detecting stations arising as a result of reflections from said boundary.

3. A method of locating subsurface electrical boundaries which comprises applying alternating current to spaced points of the earth's surface of a frequency which produces a system of potential surfaces extending to said boundary, locating detecting stations along equipotential surfaces to eliminate any potential difference between them, changing said frequency for penetration of said surfaces short of said boundary, and measuring the resulting change in potential between said detecting stations.

4. A method of electrical prospecting which comprises applying electrical energy between spaced points on the earth's surface to produce equipotential surfaces around said spaced points, locating detecting stations at points on a selected one of said equipotential surfaces, and changing the character of said applied energy to produce a potential difference between said detecting stations dependent upon changes in said equipotential surfaces resulting from changed subsurface phenomena.

5. A method of electrical prospecting which comprises applying electrical energy to spaced points on the earth, balancing out near-surface effects of said energy by locating detecting stations in a line coplanar with said spaced points and in positions which are neutral with reference to said applied energy, and varying the character of said energy to change the relative energy at said detecting stations by an amount dependent upon the resulting differing effect upon subsurface strata.

6. An electrical prospecting system comprising earth-electrodes spaced one from the other, means for applying alternating current to said earth-electrodes for producing in the vicinity of each an electrical field whose magnitude at the earth's surface is dependent upon the effect upon said field of the character of subsurface material, detecting electrodes spaced one from the other and located at equipotential points with reference to said field to avoid near-surface effects on said field, and means for changing the penetration of said field in the earth by an amount to produce a change in the potential between said detecting electrodes due substantially entirely to said effect on said field of said subsurface material.

7. An electrical prospecting system comprising earth-electrodes spaced one from the other, means for applying alternating current to said earth-electrodes for producing in the vicinity of each an electrical field whose magnitude at the earth's surface is dependent upon the effect upon said field of the character of subsurface material, detecting electrodes coplanar with each other and spaced one from the other and located at equipotential points with reference to said field to avoid near-surface effects on said field, and means for changing the penetration of said field in the earth by an amount to produce a change in the potential between said detecting electrodes due substantially entirely to said effect on said field of said subsurface material.

DAYTON H. CLEWELL.

REFERENCES CITED

The following references are of record in the file of this patent:

UNITED STATES PATENTS

| Number | Name | Date |
|---|---|---|
| 1,826,961 | Slichter | Oct. 13, 1931 |
| 2,169,685 | Evjen | Aug. 15, 1939 |
| 2,220,070 | Aiken | Nov. 5, 1940 |
| 2,294,395 | Evjen | Sept. 1, 1942 |

OTHER REFERENCES

"Geophysical Exploration," Heiland, pp. 681, 685–688, 692–696, Pub. 1940 by Prentice-Hall, Inc., N. Y.